(12) United States Patent
Parry

(10) Patent No.: US 7,321,437 B2
(45) Date of Patent: Jan. 22, 2008

(54) E-MAIL TO JOB RETENTION

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 859 days.

(21) Appl. No.: 09/966,896

(22) Filed: Sep. 28, 2001

(65) Prior Publication Data

US 2003/0063309 A1 Apr. 3, 2003

(51) Int. Cl.
*G06F 15/00* (2006.01)

(52) U.S. Cl. .............. 358/1.15; 358/1.13; 358/402; 709/201; 709/202; 709/203; 709/217; 709/218; 709/219; 709/225; 709/229; 715/500; 715/513

(58) Field of Classification Search .............. 358/1.13, 358/1.15, 1.18, 1.9, 402; 709/201, 202, 203, 709/217, 218, 219, 225, 229; 715/500, 513
See application file for complete search history.

(56) References Cited

U.S. PATENT DOCUMENTS

| | | | |
|---|---|---|---|
| 5,483,653 A | | 1/1996 | Furman |
| 5,689,642 A | * | 11/1997 | Harkins et al. ............. 709/207 |
| 5,870,089 A | * | 2/1999 | Fabbio et al. ................ 715/733 |
| 5,956,487 A | | 9/1999 | Venkatraman et al. |
| 5,995,723 A | | 11/1999 | Sperry et al. |
| 5,999,945 A | | 12/1999 | Lahey et al. |
| 6,052,198 A | | 4/2000 | Neuhard et al. |
| 6,750,982 B1 | | 6/2004 | Takaira et al. |
| 6,980,319 B2 | * | 12/2005 | Ohta .......................... 358/1.18 |
| 7,016,057 B1 | * | 3/2006 | Maruyama .................. 358/1.15 |
| 7,072,059 B2 | * | 7/2006 | Van Der Linden et al. 358/1.15 |
| 7,120,634 B2 | * | 10/2006 | Jecha et al. .................... 707/9 |

FOREIGN PATENT DOCUMENTS

EP 1 056 247 A2 * 5/2000

* cited by examiner

*Primary Examiner*—Twyler Lamb
*Assistant Examiner*—Vu Hang

(57) ABSTRACT

The present invention relates to a system and method for transmitting and storing print jobs sent via e-mail. A first embodiment entails sending a document to be printed as an e-mail attachment to an e-mail enabled printer. The printer extracts the document from the e-mail attachment and performs any necessary decompression, decoding, and translation. The document may be placed in a print queue for printing and/or the document may be stored in a job retention area of printer memory. Preferably, the e-mail, which delivers the print job to the document to the printer, may specify various print settings for printing the document, as well as storage options and access rights if the document data is stored in job retention.

In a second embodiment, an e-mail enabled print server is configured to extract documents sent as attachments to an e-mail and to distribute the print jobs to a network printer.

24 Claims, 2 Drawing Sheets

E-MAIL TO JOB RETENTION

FIELD OF THE INVENTION

The present invention relates generally to network printers and, more particularly, to a system and method for transmitting and storing data representing a print job using e-mail messaging in conjunction with a network printer.

BACKGROUND OF THE INVENTION

In a typical printing process over a network environment, a user at computer workstation typically uses printer-specific print driver software to load documents or images into a buffer (usually an area on a disk of a workstation), where a printer pulls them off the buffer at its own rate. The user may also use the print driver software to manually adjust the print attributes, which instruct the printer on the proper processing of the document or image files. Print attributes typically include image options (e.g., resolution, background), image orientation (landscape, portrait, etc.), number of copies, colors, duplex (double-sided) or single-sided printing, and other printing parameters.

The print driver also functions to convert the text, graphics and print attributes specified by the user's workstation into a set of codes that the printer can translate and/or read. The set of codes is typically a version of Printer Control Language (PCL), developed by Hewlett-Packard for its dot-matrix, inkjet, and LaserJet series printers. The version of PCL most commonly used as the printer coding language is Page Description Language (PDL). Once the text, graphics and print attributes have been converted to PDL, the PDL is transmitted by the workstation over the network, where it is received by the printer as a "print job." Examples of PDL's include Hewlett Packard's HP-GL/2 language and Adobe's PostScript®.

As the printer receives the coded language from the print driver, it stores the information in high capacity memory storage (job retention), which typically comprises random-access memory (RAM), or a hard disk. A stored print job thus comprises of one or more electronically-stored files and the print attributes associated therewith. Before a typical print job (e.g., a PDL file) can be printed, however, its contents must be converted to a bit-mapped image format, also known as a raster image. The raster image is a bit-mapped representation of the document to be printed, with each bit in the bitmap representing the absence or presence of a dot (or pixel) on the printed page.

A raster image processor ("RIP") in the printer typically translates PDL files to a raster image, also called a "RIP'ed" version of the file. Thus, the print files include data representing graphical images and the RIP'ed version is generated from the print file. Typically, print jobs are RIP'ed before storage in job retention, making them "print ready files." In some cases, print jobs are received by the printer in the form of raster image data. In that case, a processor in the printer may engage in pixel image manipulation when storing the print job.

While print driver software is effective for sending a print job across a network, a driver-less printing system would offer some distinct advantages. For example, convenient systems do not presently exist for the remote transmission of a print job to a networked printer. Several reasons exist for this deficiency, including the fact that many remotely situated users may not have the specific print driver software needed for operation of a particular printer located on a network.

As an additional obstacle to printing by remotely located users, many networks have hardware and/or software firewall systems in place. These firewall systems act to block various external data transmissions from being sent to locations residing inside the network. In this regard, most firewall systems are restrictively configured to allow remotely situated users to access web pages within the network (via HTTP protocols), and to block all other access. Furthermore, and assuming print jobs intended for a particular network printer on a network could be sent over the Internet, such transmissions may require a particular network port (e.g., port 80) in the firewall system to remain "open," thus increasing the possibility of security breaches. In addition to port access issues, the unique network address of the printing component may have to be specified in the transmission.

For users desiring to print from both inside and outside of a local network environment, making use of the proper printer-specific driver software is further problematic when a new printer has been added to the network. This is because the newly incorporated printer likely will not be operable under existing driver software.

Additionally, and for a variety of reasons, at least some of the existing users on a local network will not usually have the driver software or port configurations enabling them to print to certain on the various printing devices also located within the local network.

Thus, driver software and network configurations may not be effective or convenient for the submission of some print jobs to a network printer. This is particularly true in the case of a remotely situated user desiring to send print jobs to a printer residing on a local area network. Accordingly, what is needed in the art is a method and system for printing which provides increased flexibility, convenience and other advantages for locally and remotely situated users desiring to print or store a document on a network printer.

SUMMARY OF THE INVENTION

The present invention relates to a system and method for transmitting and storing print jobs sent via e-mail. In a first embodiment, a method of sending a print job to a printer is provided. The method entails selecting a document for printing; attaching the document to an e-mail message; sending the e-mail message over a network to an e-mail enabled printer; and extracting the document from the e-mail message by the e-mail enabled printer. In a preferred aspect of the embodiment, the document is stored in job retention of the e-mail enabled printer. Additionally, instructions for storing the document may be specified in a portion of the e-mail message, which is read by the e-mail enabled printer.

A second embodiment of the invention provides a method of distributing a document for printing. The method comprises selecting at least one document for printing; attaching the at least one document to an e-mail message; sending the e-mail message to an e-mail enabled print server of a local network; extracting the at least one document at the e-mail enabled print server; and sending the at least one document to a network printer of the local network by the e-mail enabled print server. The embodiment further includes converting the at least one document into a print ready file by the e-mail enabled print server prior to sending the at least one document to the network printer. The at least one document may also be stored and/or printed by the network printer.

A system for receiving and distributing a remotely sent print job to a network printer is also provided. The system comprises an e-mail enabled print server device in communication with a network, the e-mail enabled print server configured for receiving an e-mail message having a document sent as a print job attached thereto, the e-mail enabled print server configured for extracting the document from the e-mail message and transmitting the document to at least one network printer device; and a network printer device configured to be communicatively coupled to the e-mail enabled print server device over the network, the network printer device configured for storing and printing print jobs transmitted by the e-mail enabled print server device. According to a preferred aspect of the system, the e-mail enabled print server includes a microprocessor configured for converting the document sent as a print job into a print ready file.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE PREFERRED EMBODIMENTS

The present invention relates to a method and system for transmitting print jobs via e-mail where the print jobs may be printed and/or stored in a network printer. In a first embodiment of the invention, a print job is sent via an e-mail attachment to an otherwise conventionally configured printer which is assigned an e-mail account. An e-mail client residing on, or associated with, the printer extracts the e-mail attachment and a microprocessor of the printer performs any necessary decompression, decoding, and translation. The e-mail client may place the print job in a print queue for printing and/or the print job may be stored in a job retention area of printer memory. In a preferred embodiment of the invention, the e-mail message which delivers the print job to the printer may specify various print settings for the print job, as well as, for example, a file name for the print job and access rights to the print job if the print job is stored in job retention.

In a second embodiment of the invention, an e-mail enabled print server is provided which has access to an assigned e-mail account. The e-mail enabled print server is configured to extract print jobs sent as attachments to an e-mail and to distribute those print jobs to a network printer.

Figure 1:
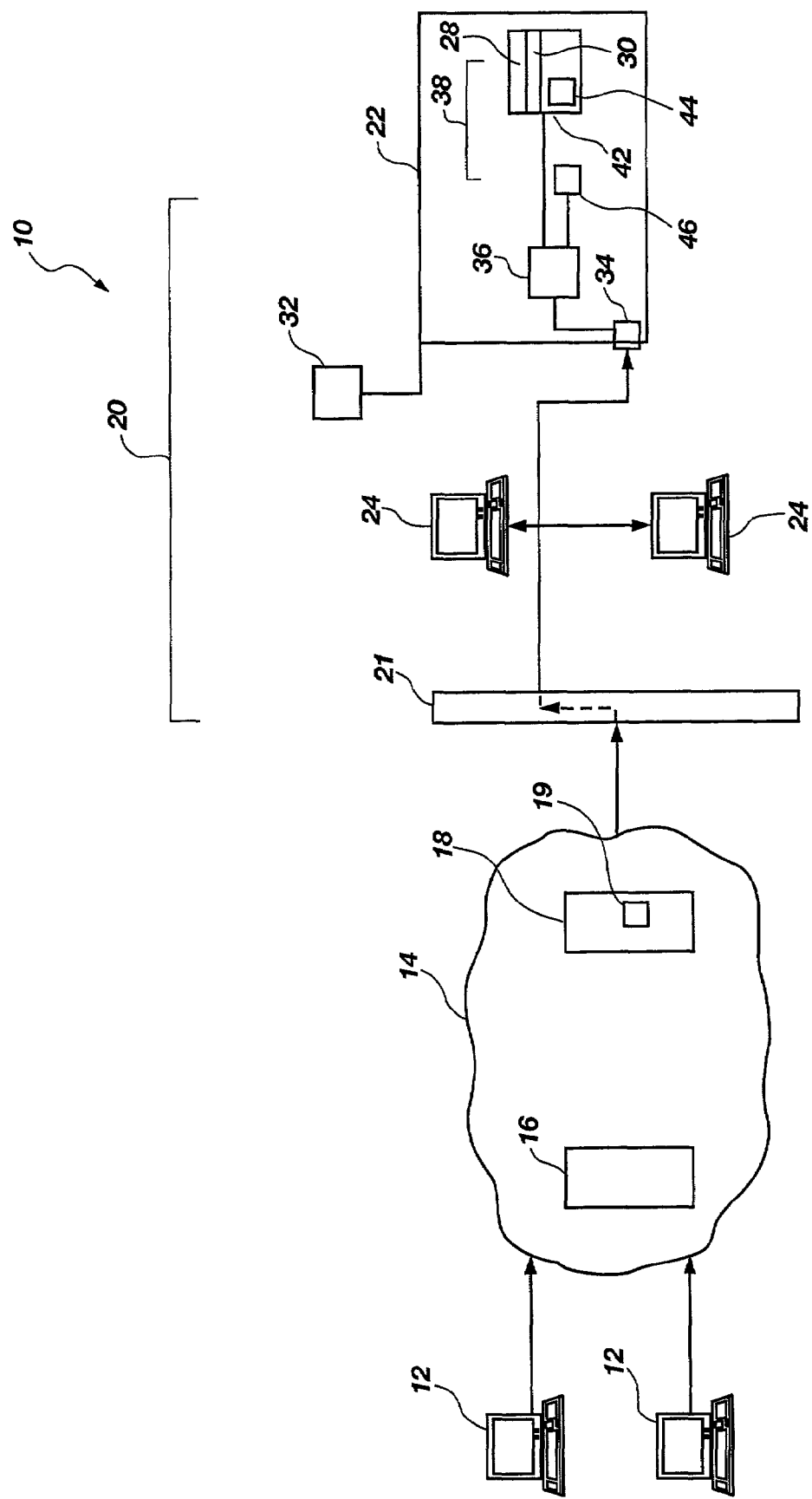
FIG. 1 is a simplified diagram of a system for carrying out an embodiment of the present invention.

A first system for carrying the embodiments of the present invention is shown in drawing FIG. 1. Therein, a printing system 10 comprises, in one aspect, one or more e-mail enabled devices, such as a computer workstation, phone, or a personal digital assistant (PDA), which are connectable through the Internet 14 to a first e-mail server 16 (e.g., a Simple Mail Transfer Protocol (SMTP) server). In drawing FIG. 1, the assortment of e-mail enabled devices is collectively represented as remote workstations 12 for ease of illustration and convenience of discussion. First e-mail server 16 is conventionally configured for storing and forwarding e-mail messages sent by an e-mail client of a first interconnected device (e.g., a remote workstation 12), and then routing the e-mail in accordance with a destination address specified therein.

Printing system 10 also comprises a network 20 linked to Internet 14, wherein network 20 includes an e-mail enabled printer 22 and, optionally, other networked devices, such as networked workstations 24. Network 20 will typically be a local area network (LAN) or wide area network (WAN) in which network components are interconnected with one another through data communication links known in the art. A firewall 21 will be typically, but not necessarily, provided as a further component of network 20. Firewall 21 comprises hardware and/or software that filters all data traffic routed between Internet 14 and network 20 as a security measure against authorized entry into network 20.

A second e-mail server 18 may be located within network 20, or may reside on the Internet 14 (as shown in drawing FIG. 1). When provided as a component in network 20, second e-mail server 18 may be located within a LAN or WAN, as is the case in many office environments. When residing on Internet 14, second e-mail server 18 may be operated, for example, by an Internet Service Provider (ISP), in which case second e-mail server 18 will typically be available by subscription. Second e-mail server 18 is configured to receive e-mail messages, such as e-mail messages appropriately routed from first e-mail server 16, and to respond to e-mail clients having authorization rights to an e-mail account serviced by second e-mail server 18. In this regard, second e-mail server 18 is responsive to requests to transmit e-mail messages to authorized e-mail clients, which make such requests using an appropriate protocol, such as the Post Office Protocol (POP3), the Internet Message Access Protocol (IMAP), or the Simple Mail Transfer Protocol (SMTP).

Still referring to drawing FIG. 1, networked workstations 24 are shown connected to e-mail enabled printer 22 through a communication link 26, which may include, for example, one or more of an internet connection, a wireless connection, LAN (e.g., Ethernet, token ring, etc.), WAN, bus line, Fibre Channel, ATM, or a direct connection using a parallel or serial cable.

Networked workstations 24 and remote workstations 12 will preferably be conventionally configured, and thus have a display, microprocessor, RAM, ROM, hard disk, keyboard, and input/output interfaces. Networked workstations 24 and remote workstations 12 also include a conventional e-mail client configured for sending, receiving and organizing e-mail messages. Networked workstations 24 and remote workstations 12 may comprise any number of workstations (or other e-mail enabled devices). Typically, but not necessarily, networked workstations 24 are located in an office setting. Of course, one or more of networked workstations 24 may be a workstation of a network administrator. Preferably, at least one, and preferably all, of networked workstations 24 is/are configured with software for accessing, managing, and/or retrieving print job data filed stored in a print job retention portion of e-mail enabled printer 22, as will be described later herein.

E-mail enabled printer 22 is linkable though network 20 to second e-mail server 18 by conventional communication links known in the art. E-mail-enabled printer 22 is configured with an e-mail client 28, which uses an appropriate protocol (e.g., POP3, IMAP, SMTP, etc.) for requesting and receiving e-mail messages stored on second e-mail server 18. E-mail client 28 may be a conventional e-mail client known in the art, such as GroupWise® by Novell or Outlook® by Microsoft, or may be an e-mail client specially designed for the methods of the present invention. The operation of e-mail client 28 is described in more detail below. E-mail enabled printer 22 further includes conventional printer hardware and software known in the art.

Additionally, e-mail-enabled printer 22 may be configured as a laser printer, an impact printer, a photographic printer, an inkjet printer, or the like.

As used herein, use of the term "e-mail enabled printer" refers to an otherwise conventional printer linked to a network and configured with, or associated with, e-mail client software. An e-mail enabled printer of the present invention is assigned an e-mail address and has an e-mail account accessible by the e-mail enabled printer. The e-mail client software of an e-mail enabled printer is configured to request and receive e-mail messages stored at a destination associated with the e-mail address. An "e-mail enabled printer" is primarily configured as a device used to fulfill network needs for printing text and/or graphics on paper, and thus includes standard features associated with conventional printers, such a variety of print and paper options, a print queue, and the like. The term "e-mail enabled printer", as used herein, specifically excludes internet-based facsimile machines and other types of e-mail-capable facsimile machines that are configured, in whole or in part, to send or receive pictures and text over a telephone line using a modem.

At least one e-mail account is "owned" by e-mail enabled printer 22, which in drawing FIG. 1, corresponds to an e-mail inbox 19 provided by second e-mail server 18 and accessible by e-mail enabled printer 22. As used herein, an "e-mail inbox" is a file, or a directory of files, where incoming e-mail messages are stored. E-mail enabled printer 22 is assigned an e-mail address (e.g., laser1@hp.com) and e-mail ID for each of the e-mail accounts "owned" by e-mail enabled printer 22. E-mail messages addressed to e-mail enabled printer 22 are thus received and stored in the e-mail inbox 19 of second e-mail server 18.

E-mail enabled printer 22 is preferably provided with print server software 30 configured for receiving, organizing, and storing print jobs transmitted from the at least one e-mail account owned by e-mail enabled printer 22. Access rights to the at least one e-mail account are preferably automatically authenticated when e-mail enabled printer 22 is powered on. For example, e-mail client software 28 residing in e-mail enabled printer 22 may automatically submit a password to second e-mail server 18 over network 20, the successful submission and receipt of the password allowing access to the e-mail account owned by e-mail enabled printer 22.

E-mail enabled printer 22 also includes one or more local displays 32, which may comprise a conventional monitor, a monitor coupled with an integrated display, an integrated display (e.g., an LCD display), or other means for viewing print queues, print attributes, and associated data or processing information, including printer specific information. Preferably, the local display 32 comprises a control panel having touch screen controls for altering print settings, print queues, print job retention, and other hardware and software aspects of e-mail enabled printer 22. E-mail-enabled printer 22 also includes a network interface (I/O) 34 for bi-directional data communication with networked components inside network 20 (e.g., networked workstations 24) and linkable devices residing outside network 20 (e.g., second e-mail server 18). One or more software applications for operating e-mail enabled printer 22 in accordance with the principles of the present invention are stored in read-only-memory (ROM) 46 and/or hard disk memory 42 of e-mail enabled printer 22.

E-mail enabled printer 22 further includes a microprocessor 36 and memory 38 in the form of RAM 40 and/or hard disk memory 42, which may be associated with a print cache of e-mail-enabled printer 22, or which may be provided separately from the print cache. As used herein, printer memory designated for temporarily or permanently storing one or more print jobs on hard disk memory 42 or other data storage device in e-mail enabled printer 22 is referred to as "job retention" 44. In this regard, job retention 44 may be provided as a directory, series of directories, or one or more subdirectories configured for the storage of various print job data.

The print jobs stored in job retention 44 are accessible by a control panel on e-mail enabled printer 22, and/or by, for example, a control panel graphical user interface and associated driver software residing on networked workstations 24. While residing in job retention 44, print jobs may be accessed, managed, and printed from the aforementioned control panels. By storing a copy of a print job in job retention 44, copies of the stored print job can be produced at e-mail enabled printer 22 at any time. Job retention 44 is particularly advantageous for use in storing files used for frequent, on-demand printing, such as various types of forms (e.g., personnel forms, accounting forms, and other forms that are regularly printed), reports, calendars, time sheets, and the like. Job retention 44 can also be used to proof one copy before printing additional copies of a print job, and to print a "private print job" using, for example, a personal identification number (PIN) to release the private print job to the print queue.

Preferably, microprocessor 36 of e-mail enabled printer 22 is configured to translate coded language received from print job data files ("print jobs"), including print job data sent by e-mail transmissions, into a bit-mapped image format (raster image format). Microprocessor 36 further works in conjunction with print server 30 and/or other associated software to store and/or queue the translated data files. In one aspect of the invention, print jobs transmitted to e-mail enabled printer 22 are stored in high capacity memory storage (e.g., job retention 44) associated with e-mail enabled printer 22. Microprocessor 36 is thus adapted for RIP'ing print jobs (i.e., turning the print jobs into a raster image format) and storing the resulting "RIP'ed" print jobs, which represent graphical images of text or drawings along with any associated print attributes, as "print ready files" in job retention 44.

Methods of transmitting, printing and storing print jobs using the print system 10 of FIG. 1 will now be described. In one embodiment of the present invention, one or more users situated at remote workstations 12 generate or acquire documents to be sent as print jobs to e-mail enabled printer 22. As remote workstations 12 are located outside of network 20, a convenient means for printing on e-mail enabled printer 22 does not exist since conventional driver software on remote workstations 12 is typically not configurable for such purposes, and because firewall 21 of network 20 may block access to e-mail enabled printer 22 in any event. In accordance with the present invention, however, a user at a remote workstation 12 may open an e-mail client residing on their respective machine and "compose" an e-mail message, which contains the destination address of e-mail, enabled printer 22 (e.g., laser1@hp.com). The user then attaches the document desired for printing to the e-mail message in a standard manner, such as by pointing and clicking on an attachment button and then browsing for the location of the document (print job file) to be attached.

The document file to be printed may be provided as an attachment to the e-mail message in a variety of conventional formats, including application-specific formats, such as Microsoft Word®, WordPerfect®, Lotus WordPro®, Adobe Acrobat PDF®, HTML, and the like. The attached print job data may also be provided as an attachment to the e-mail message in a bit-mapped image file format (e.g., device-independent bit-map (DIB), JPEG, GIF, Windows Metafile Format (WMF), PICT format, TIFF format, etc.). In essence, any conventional form of file format for attachment to an e-mail message may be used. When attaching a bit-mapped or other binary file to the e-mail message, the attached file usually will be encoded as text since under present e-mail messaging systems, e-mails must contain text rather than bi-level data. In this regard, UUencode may be used to disguise the binary file as text by using an algorithm to convert the file into a series of ASCII characters (e.g., 7 bit ASCII characters) susceptible of transmission over the Internet. For relatively large files, such as large bit-mapped files, compression software may be used to compress the document file for attachment to the e-mail.

In a less preferred embodiment, driver-type software in conjunction with a microprocessor of remote workstation 12 may convert the to-be-attached document file to a printer language, such as a version of Printer Control Language (PCL) (e.g., PDL), prior to attaching the file. This conversion step may occur automatically before the file is attached, or conversion may occur through user-initiated activation of conversion software on remote workstation 12.

To send the e-mail message plus the attachment, the user sending the e-mail message (the "sending party") on remote workstation 12 identifies e-mail enabled printer 22 by entering its unique e-mail address in an "address" field of the e-mail, the entered e-mail address used in routing the e-mail to a destination accessible by e-mail enabled printer 22. The sending party then initiates transmission of the e-mail message, upon which the e-mail client on the sending party's remote workstation 12 interacts over the Internet 14 with first e-mail server 16 by a conventional protocol (e.g., Simple Mail Transfer Protocol ("SMTP")). As previously discussed, first e-mail server 16 will typically exist on the Internet 14, and comprises a conventional store-and-forward e-mail device.

Upon receipt by first e-mail server 16, the destination address specified by the e-mail message is examined and processed for proper routing over Internet 14 using, for example, a Domain Name Server which provides a data table containing a list of domain names and corresponding e-mail addresses. The e-mail and attachment are then submitted over Internet 14 by conventional protocols to second e-mail server 18 in accordance with the e-mail destination address of the e-mail message. As previously discussed, second e-mail server 18 may exist locally within network 20 or be situated in a location external to network 20 (e.g., on Internet 14 as shown in drawing FIG. 1).

When the transmitted e-mail and attachment are received by second e-mail server 18, the e-mail and attachment are stored therein in an individual e-mail account (an e-mail inbox 19) accessible by e-mail enabled printer 22. If additional e-mail addresses have been specified by the user at remote workstation 12, the e-mail and the attachment are also delivered to respective e-mail servers (not shown) servicing the e-mail accounts for those addresses.

Upon being powered on, e-mail client 28 of e-mail enabled printer 22 automatically communicates directly with second e-mail server 18 using appropriate protocols (e.g., SMTP, IMAP, POP3, etc.). E-mail client 28 will first typically authenticate its access to an e-mail account of e-mail enabled printer 22 by, for example, submitting a designated password to second e-mail server 18. After authentication, the e-mail client 28 requests the transmission of one or more e-mails from second e-mail server 18 to e-mail enabled printer 22. After the authentication process, e-mail client 28 periodically polls the e-mail inbox 19 assigned to e-mail enabled printer 22 to request second e-mail server 18 to deliver any further messages addressed to e-mail enabled printer 22. If e-mail enabled printer 22 is not available or otherwise unable to receive e-mail messages from second e-mail server 18, the e-mail messages remain in the e-mail inbox 19 of second e-mail server 18 until requested by e-mail enabled printer 22.

In another aspect of the embodiment, a user at, for example, a networked workstation 24 may also be provided with access to the e-mail inbox 19 owned by e-mail enabled printer 22 for purposes of viewing and downloading e-mail messages therein. Such access may be accomplished via operation of an e-mail client of the networked workstation 24 and a successful login attempt on e-mail inbox 19. Access by a networked workstation 24 may be useful, for example, for downloading copies of the document specified by the data in the attachment and/or for reviewing records of past and current e-mail transmissions.

With further reference to drawing FIG. 1, second e-mail server 18 responds to the requests of e-mail client 28 by sending the e-mail message and its attachment over network 20 to e-mail enabled printer 22. The e-mail message and attachment are then received by e-mail client 28 residing on e-mail enabled printer 22. Upon receipt of the e-mail message and attachment, a script associated with e-mail client 28 identifies the location of the attachment and automatically "strips" the attachment from the e-mail message.

E-mail client 28 of e-mail enabled printer 22 then decodes (e.g., by UUdecode) and decompresses, if necessary, any binary files, which were encoded and/or compressed to permit transmission of the print job data, file attachment by e-mail. The binary files are then transferred to print server 30, which automatically stores the data files in job retention 44 and/or places the data files in the print queue of e-mail enabled printer 22.

In the case of print job data files sent as an e-mail attachment in an application-specific format, the data file representing the print job may be translated by printer-specific driver software associated with e-mail enabled printer 22 into a PCL language that the printer can understand. A preferred PCL language is page description language (PDL) (e.g., Hewlett Packard's HP-GL/2 language and Adobe's PostScript®).

After translation in a PCL language, the translated data file is converted by microprocessor 36 into a bit-mapped image format (a raster image). The raster image of the print job data file is then sent by print server 30 to job retention 44, where the raster image is stored in job retention 44 and/or queued for printing as a "print ready file" (i.e., a print job in a form ready for printing by e-mail enabled printer 22). When storing the raster image in job retention 44, microprocessor 36 of e-mail enabled printer 22 printer may engage in pixel image manipulation dependent upon the particular image file.

Alternatively, the print job data file may be temporary routed to another networked device (e.g., a standalone print server) over network 20 for various translation purposes, then rerouted back to e-mail enabled printer 22 for storing, queuing and/or printing when the translation has been completed.

The print ready file may thus be printed by e-mail enabled printer 22 and/or automatically stored in job retention 44. The printing and/or storing operations may occur by default, or in accordance with specified instructions or other programming. When stored in job retention 44, the print ready file may be later printed or otherwise accessed using a control panel interface on e-mail enabled printer 22 or on one or more networked workstations 24.

In one aspect of the embodiment, an e-mail message to be sent to e-mail enabled printer 22 may specify various settings relating to the storage and/or printing of the print job data file attached thereto. For example, a user at a remote workstation 12 may set printing attributes via configuration files that are encoded, embedded or otherwise present (e.g., in plain sight) within the e-mail message (e.g., within the body of the e-mail message). For example, MIME encoding fields or a similar method could be used to encode printer readable language (e.g., PDL) specified in the body of the e-mail message; the printer readable language specifying various printing attributes. Such printing attributes may include printing image resolution (e.g., dots per inch), paper handling options, printing speed, number of copies, two-sided printing, banner page printing, and the like. In one aspect of the embodiment, instructions which schedule specific times and dates for printing of the print job data file may be specified in the body of the e-mail message. In each case, software within e-mail enabled printer 22 is provided to translate or read the commands in the printer readable language and to adjust the print attributes or other printer settings/configurations accordingly. These attributes, settings and/or configurations may then be associated with the data contained in the print job and stored in job retention 44 therewith. Of course, the print job may also be printed directly by e-mail enabled printer 22 using the specified attributes, settings and/or configurations set forth by the e-mail message.

Storage options for storing the attached print job data files in job retention 44 may also be specified within in the e-mail message in the manner previously described. Such storage options include the designation of a particular directory or subdirectory within job retention 44 for storing the attached print job data files, as well as instructions for overwriting the print job data files after a certain period of time. Similarly, instructions may be provided to replace a particular print job previously stored in job retention 44 with the print job data file specified in the subject e-mail attachment.

In a still further aspect of the embodiment, a personal identification number (PIN) and/or password may be incorporated within the e-mail message in the manner previously described. In this regard, the attached print job data file may be stored in job retention 44 as a "private job," wherein the print job data file is not accessible or printable until it is released by entry of the PIN and/or password by a user having knowledge of the PIN and/or password.

Descriptive information regarding the attached print job data file may also be specified in the body of the e-mail message for use in storing and/or printing the attached print job data file. For example, a unique file name may be specified which is used by e-mail enabled printer 22 in queuing and printing the print job data file and/or in storing the print job data file in job retention 44. Thus, the print job data file may be easily identified, accessed and/or retrieved in job retention 44 through, for example, specification of the file name using control panel operations at the e-mail enabled printer 22 or at a networked workstation 24.

In yet another aspect of the embodiment, e-mail enabled printer 22 is configured to print text in the body of the e-mail message as a leading page or banner page prior to printing the subject print job data file. In this embodiment, a user at a remote workstation 12 may type or paste text in the body of the e-mail message that, upon receipt by e-mail enabled printer 22, is associated with the print job data file to be printed therewith. The text may also be stored with the print job in job retention 44, for example, in accordance with printer commands embedded or otherwise present in the e-mail message. This aspect of the embodiment is advantageous for use when the user desires to specify the source or the recipient of the print job, as well as to specify any handling or distribution instructions for the print job.

In a related embodiment, a script associated with e-mail client 28 of e-mail enabled printer 22 is configured to extract or "read" the e-mail address in the "From" portion of the e-mail message, and to associate the e-mail address with the print job data file in the e-mail message attachment for storage in job retention 44. The e-mail address may then be used by, for example, print server 30 and microprocessor 36 in identifying a particular directory or subdirectory within job retention 44 in which the print job data file is to be stored, and storing the print job data file in that directory or subdirectory. Thus, in this aspect of the invention, all e-mail messages sent from a particular e-mail address may be stored in the same directory or subdirectory within job retention 44. The e-mail address from the e-mail message can also be printed as a banner page to identify the source of the print job when it is printed by e-mail enabled printer 22.

Figure 2:
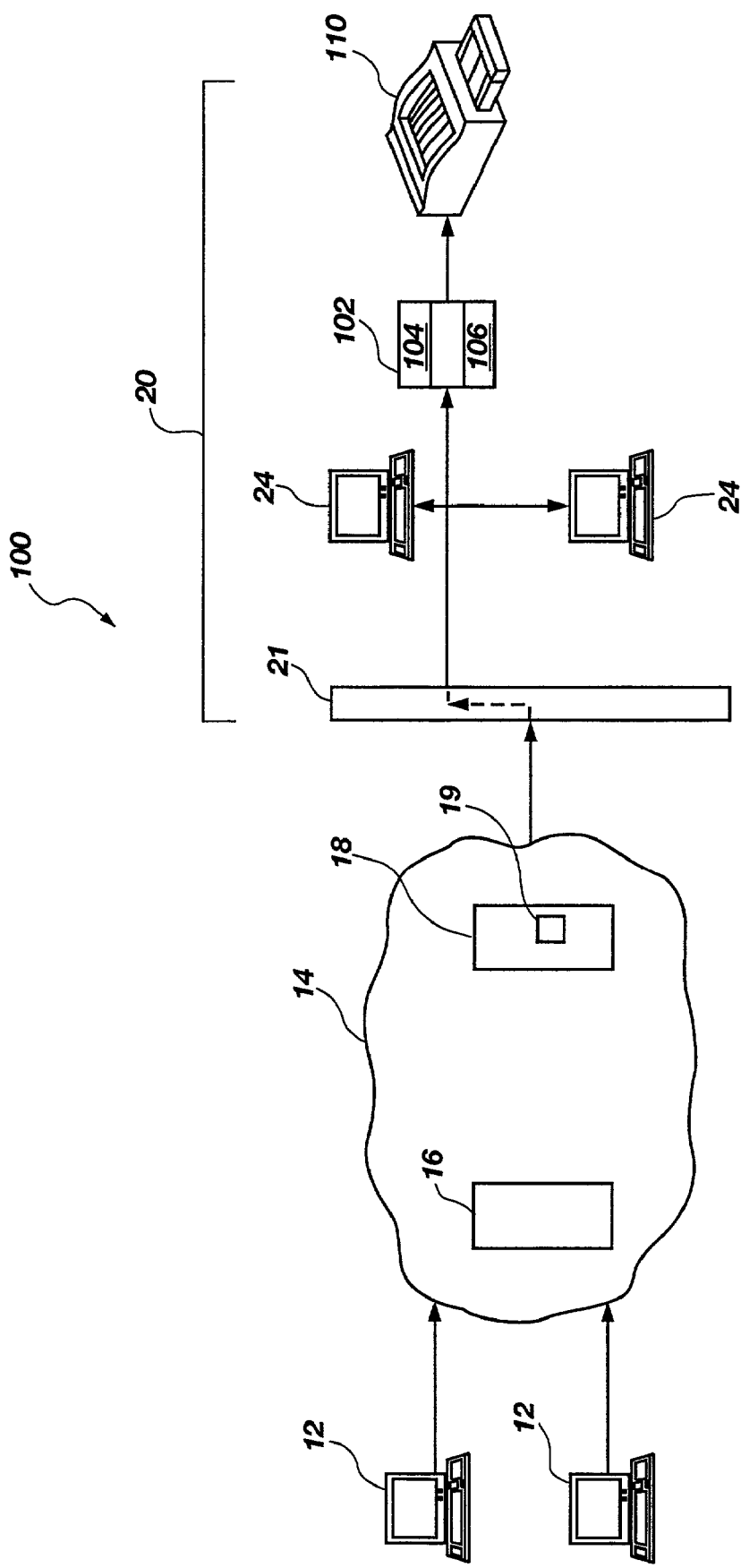
FIG. 2 is a simplified diagram of an alternate embodiment of a system according to the present invention.

An alternate embodiment of the present invention is shown in drawing FIG. 2. Like components in drawing FIG. 2 are referenced by the same reference numerals as used in drawing FIG. 1. As illustrated in drawing FIG. 2, a printing system 100 comprises remote workstations 12, Internet 14, a first e-mail server 16, a second e-mail server 18, a network 20, and networked workstations 24, with each of these components functioning in essentially the same manner as previously described in relation to drawing FIG. 1, above.

Additionally included in printing system 100 is an e-mail enabled print server 102, which is assigned an e-mail address and e-mail account in the manner of the e-mail enabled printer 22 of drawing FIG. 1. E-mail enabled print server 102 will typically comprise a stand-alone, networked device linked in network 20 to a network printer 110 and configured to be communicatively coupled with second e-mail server 18. E-mail enabled print server 102 may be a dedicated device configured for serving a network's printing functions. Typically, e-mail enabled print server 102 and network printer 110 will be located within the same local network (e.g., office) environment. Second e-mail server 18 may also be located in the same local network as e-mail enabled print server 102 and network printer 110. Alternatively, second e-mail server 18 may reside on Internet 14 in the manner previously described in relation to drawing FIG. 1.

E-mail enabled print server 102 comprises a print spooler device that accepts requests for network printer 110 resources, and then allocates the use of network printer 110 resources according to a set of specified rules. E-mail enabled print server 102 is configured with a memory 104 for temporary and/or permanent storage of print jobs received by e-mail enabled print server 102.

As will be described in more detail hereinafter, e-mail enabled print server 102 is configured to extract a print job data file from an attachment of an e-mail retrieved from e-mail server 22, and to place that print job data file on a print queue of e-mail enabled print server 102 for printing and/or storage by network printer 110.

E-mail enabled print server 102 is thus configured to receive e-mail messages and attachments from an e-mail inbox 19 associated with second e-mail server 18. With further regard to drawing FIG. 2, the e-mail messages and attachments originate from networked or web-based devices, such as remote workstations 12. Briefly, a user at remote workstation 12 may desire to have a particular document printed as a print job printed on network printer 110. To print on network printer 110, the user generates an e-mail and attaches the document to the e-mail as an e-mail attachment. The user then specifies a destination address representing the e-mail account and inbox 19 of e-mail enabled print server 102. The e-mail and attachment are then routed in the manner previously described to second e-mail server 18. The e-mail and attachment are thereafter downloaded from inbox 19 of second e-mail server 18 to e-mail enabled print server 102.

E-mail enabled print server 102 is configured with e-mail client software 106 capable of communicating with second e-mail server 18 by an appropriate protocol (e.g., SMTP, IMAP, POP3, etc.). E-mail client software 106 authenticates access rights to its e-mail account in second e-mail server 18, and requests downloads of e-mail messages and attachments to e-mail enabled print server 102.

When the e-mail message and attachment have been received by e-mail enabled print server 102, a script associated with e-mail client software 106 identifies the location of the attachment and automatically "strips" the attachment from the e-mail. E-mail client software 106 of e-mail enabled print server 102 may then decode (e.g., by UUdecode) and decompress the data file in the attachment, if necessary.

For print jobs sent as attachments in an application-specific format (e.g., Microsoft Word®, WordPerfect®, Lotus WordPro®, Adobe Acrobat PDF®, etc.), e-mail enabled print server 102 preferably is associated with driver software that converts the print job data file into a printer control language understood by networked printer 110. In this regard, the driver software may reside on e-mail enabled print server 102, or e-mail enabled print server 102 may reroute the print job data file to another networked device for translation.

Alternatively, network printer 110 may be configured with the appropriate driver software to make the necessary conversions. In this case, network printer 110 will also convert the print job data file into a raster image as a print ready file. Network printer 110 may then print, queue and/or store the file in accordance with its own programmed instructions, or instructions received from e-mail enabled print server 102. In a further aspect of the embodiment, commands relating to the printing, queuing and/or storage of the print job are transferred and read from a portion of the subject e-mail message.

In another aspect of the embodiment, e-mail enabled print server 102 is further configured to convert the print job data file into a bit-mapped image format (a raster image), if the print job was not originally provided in that format when attached to the e-mail message at remote workstation 12. The raster image data is then written into a temporary file from which the e-mail enabled print server 102 will write the data to network printer 110 when network printer 110 is available for receiving the data.

Upon receiving the raster image data from e-mail enabled print server 102, network printer 110 directly prints, queues, or stores (in job retention portion of network printer 110) a document representing the print job data sent as an e-mail attachment from remote workstation 12.

As was previously discussed in relation to the e-mail enabled printer of drawing FIG. 1, the e-mail message may contain commands therein which specify various settings relating to the storage, queuing and/or printing of the attached print job. In this regard, print server 102 may extract or read the commands, and also translate the commands into printer control language readable by network printer 110 if necessary. The commands are then associated with the data in the subject print job such that network printer 110 will print, queue, and/or store the print job in the manner specified by the commands.

The raster image data will typically remain on queue until printed, at which time incoming print jobs may be allowed to overwrite the subject data. Typically, the print jobs in the queue of e-mail enabled print server 102 will be pulled off the queue in the order the print jobs were received. In one aspect of the embodiment, however, the immediacy with which e-mail enabled print server 102 executes the subject raster image print job may be altered by assigning the raster image print job a higher or lower priority than other print jobs stored in the print queue of e-mail enabled print server 102. In this regard, e-mail client 106 of e-mail enabled print server 102 may be configured to automatically assign the raster image print job a predetermined priority for printing.

E-mail enabled print server 102 may be networked to a plurality of network printers 110. In this aspect of the embodiment, e-mail enabled print server 102 may be configured to send print jobs, including print jobs sent as attachments to e-mails in the manner specified above, to a network printer resource of a plurality of network printer resources which is currently underutilized or otherwise designated for receiving such print jobs.

The present invention thus advantageously provides a system and method for sending a print job to a printer via an e-mail transmission wherein the print job can be printed directly, queued, and/or stored in job retention of the printer. Use of the present invention is particularly advantageous for remotely situated users who desire to bypass a firewall security measure in sending a print job to an otherwise inaccessible network printer. The present invention also provides methods for driver-less printing, thus increasing user flexibility and convenience by enabling printing over a network without the need for printer-specific driver software. Also provided are methods for storing print jobs sent via e-mail in a job retention area of the printer, thus affording convenient on-demand printing for frequently printed documents.

It will be appreciated by those skilled in the art that the embodiments herein described while illustrating certain embodiments are not intended to so limit the invention or the scope of the appended claims. Those skilled in the art will also understand that various combinations or modifications of the preferred embodiments could be made without departing from the scope of the invention.

For example, the e-mail enabled printer or e-mail enabled print server of the present invention may be configured, for security purposes, to only download and/or open e-mails out of an e-mail inbox which have "authorized" or "known" originating addresses. In this regard, an e-mail client associated with the e-mail enabled printer or the e-mail enabled print server may be programmed to recognize and download only e-mails, which have been sent from a list of preauthorized e-mail users. The authorized addresses may be specified or otherwise programmed, for example, into a database associated with the e-mail client of an e-mail enabled printer or e-mail enabled print server. Thus, the e-mail client of the subject devices may check the database to determine whether the e-mail is authorized for downloading and/or opening. Further in this regard, the e-mail client of the devices can be configured to accept or reject all e-mails originating from specified domains.

As a second example, the e-mail enabled printer or e-mail enabled print server of the present invention may accept print jobs provided as attachments to e-mail messages which are sent by e-mail enabled devices residing within the same network (e.g., LAN or WAN) as the e-mail enabled printer or e-mail enabled print server. Thus, the present invention also contemplates printing and storing print jobs sent as e-mail attachments by, for example, network workstations 24 of FIGS. 1 and 2.

Thus, while certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A method of sending a print job to a printer, comprising:
    attaching at least one document for the print job to an e-mail message;
    specifying instructions for printing the at least one document within the e-mail message, the instructions comprising user selected printing attributes for printing the at least one document;
    sending the e-mail message with the at least one document attached thereto and the instructions for printing the at least one document specified therein over a network to an e-mail enabled printer, where the e-mail enabled printer includes e-mail client software; and
    extracting the at least one document and the instructions for printing the at least one document from the e-mail message by the e-mail enabled printer.

2. The method of claim 1, further comprising storing the at least one document in job retention of the e-mail enabled printer.

3. The method of claim 2, further comprising specifying instructions for said storing the at least one document in said job retention in a portion of the e-mail message, and reading said instructions for said storing the at least one document by said e-mail enabled printer.

4. The method of claim 2, wherein said storing the at least one document in said job retention comprises storing the at least one document in said job retention in accordance with an e-mail address from which the e-mail message was sent.

5. The method of claim 1, further comprising printing the at least one document by the e-mail enabled printer in accordance with the instructions for printing.

6. The method of claim 1, wherein said specifying instructions for said printing comprises specifying said instructions within a body of the e-mail message.

7. The method of claim 1, wherein said specifying instructions for said printing further comprises specifying access to the at least one document.

8. The method of claim 1, wherein said specifying instructions for said printing further comprises specifying scheduling instructions for scheduling said printing of the at least one document.

9. The method of claim 1, further comprising providing printer readable language for the at least one document with the e-mail message.

10. The method of claim 9, further comprising encoding said printer readable language prior to said sending the e-mail message over a network.

11. The method of claim 10, wherein said encoding comprises encoding said printer readable language in MIME encoding fields.

12. The method of claim 1, wherein the at least one document is attached to the e-mail message in an application-specific format.

13. The method of claim 12, further comprising converting the application specific format into a print ready file by the e-mail enabled printer.

14. The method of claim 1, wherein the at least one document is attached to the e-mail message in a bit-mapped image format.

15. A method of distributing a document for printing, comprising:
    attaching at a workstation at least one document to an e-mail message;
    specifying instructions for printing the at least one document within the e-mail message, the instructions comprising user selected printing attributes for printing the at least one document;
    sending the e-mail message with the at least one document attached thereto and the instructions for printing the at least one document specified therein to an e-mail enabled print server of a local network;
    extracting the at least one document and the instructions for printing the at least one document from the e-mail message at the e-mail enabled print server; and
    sending the at least one document and the instructions for printing the at least one document to a network printer of the local network by the e-mail enabled print server.

16. The method of claim 15, further comprising converting the at least one document into a print ready file by the e-mail enabled print server prior to said sending the at least one document to the network printer.

17. The method of claim 15, further comprising storing the at least one document in a job retention portion of the network printer.

18. The method of claim 15, further comprising printing the at least one document by the network printer in accordance with the instructions for printing.

19. A system for receiving and distributing a remotely sent print job to a network printer, comprising:
    an e-mail enabled print server for communication with a network, the e-mail enabled print server configured for receiving from a remote workstation an e-mail message having a document sent as a print job attached thereto and instructions for printing the document specified therein, the instructions comprising user selected printing attributes for printing the document, and the e-mail enabled print server configured for extracting the document and the instructions from the e-mail message and for transmitting the document and the instructions to at least one network printer; and
    a network printer configured to be communicatively coupled to the e-mail enabled print server over the network, the network printer configured for storing and for printing print jobs transmitted by the e-mail enabled print server.

20. The system of claim 19, wherein the e-mail enabled print server includes at least one microprocessor configured for converting the document sent as a print job into a print ready file.

21. A computer system for processing print jobs, comprising:
    an e-mail enabled device for creating and sending an e-mail having an attachment attached thereto and instructions for printing the attachment specified therein, the instructions comprising user selected printing attributes for printing the attachment;

an e-mail enabled printer incorporating e-mail client software for receiving the e-mail, for extracting the attachment and the instructions for printing the attachment from the e-mail, and for printing the attachment in accordance with the instructions; and a network for communicating e-mail between said e-mail enabled device and said e-mail enabled printer.

22. The computer system of claim 21, wherein said e-mail enabled printer includes a job retention memory for storing print jobs.

23. The computer system of claim 21, wherein said e-mail enabled printer comprises a set of instructions for encoding and decoding attachments into a printer readable language.

24. A computer system for processing print jobs, comprising:

an e-mail enabled device for creating and sending an e-mail having an attachment attached thereto and instructions for printing the attachment specified therein, the instructions comprising user selected printing attributes for printing the attachment;

an e-mail enabled print server for receiving said e-mail, for extracting said attachment and said instructions for printing said attachment from said e-mail, and for sending said attachment and said instructions for printing said attachment for printing;

a network printer for receiving said attachment and said instructions for printing said attachment from said e-mail enabled print server, and for printing said attachment in accordance with said instructions; and a network for facilitating communications between said e-mail enabled device, said e-mail enabled print server, and said network printer.

* * * * *